(12) United States Patent
Kamee et al.

(10) Patent No.: US 8,358,067 B2
(45) Date of Patent: Jan. 22, 2013

(54) LIGHTING APPARATUS HAVING AN IMPROVED LIGHT EXTRACTION EFFICIENCY

(75) Inventors: Hiroyuki Kamee, Ebina (JP); Takeshi Ito, Hino (JP); Masahiro Nishio, Akiruno (JP)

(73) Assignee: Olympus Corporation, Tokyo (JP)

( * ) Notice: Subject to any disclaimer, the term of this patent is extended or adjusted under 35 U.S.C. 154(b) by 267 days.

(21) Appl. No.: 12/961,561

(22) Filed: Dec. 7, 2010

(65) Prior Publication Data

US 2011/0141763 A1   Jun. 16, 2011

(30) Foreign Application Priority Data

Dec. 11, 2009   (JP) .................................. 2009-281972

(51) Int. Cl.
   *F21V 9/00*   (2006.01)
(52) U.S. Cl. .......... 313/583; 362/582; 362/94; 362/551; 362/555

(58) Field of Classification Search .................. 362/583, 362/555, 551, 84, 231, 572–574, 582; 385/901
See application file for complete search history.

(56) References Cited

U.S. PATENT DOCUMENTS

| 7,422,356 B2* | 9/2008 | Hama et al. .................... 362/574 |
| 7,600,924 B2* | 10/2009 | Hama et al. ..................... 385/73 |
| 7,758,224 B2* | 7/2010 | Hama et al. .................... 362/555 |
| 8,197,111 B2* | 6/2012 | Hama et al. .................... 362/555 |
| 2009/0003400 A1* | 1/2009 | Nagahama et al. ......... 372/50.23 |

FOREIGN PATENT DOCUMENTS

JP   2009-003228   1/2009

* cited by examiner

*Primary Examiner* — Tracie Y Green
(74) *Attorney, Agent, or Firm* — Scully Scott Murphy & Presser, PC

(57) ABSTRACT

In a lighting apparatus which emits light of a desired wavelength by irradiating excitation light from a light source to a wavelength converting member, a structure is such that a part of wavelength-converted light which is launched from the wavelength converting member is made to launch from an irradiated-light emerging area without making the light incidence again to the wavelength converting member.

19 Claims, 17 Drawing Sheets

LIGHTING APPARATUS HAVING AN IMPROVED LIGHT EXTRACTION EFFICIENCY

CROSS-REFERENCE TO RELATED APPLICATION

The present application is based upon and claims the benefit of priority from the prior Japanese Patent Application No. 2009-281972 filed on Dec. 11, 2009; the entire contents of which are incorporated herein by reference.

BACKGROUND OF THE INVENTION

1. Field of the Invention

The present invention relates to a lighting apparatus.

2. Description of the Related Art

At present, a fiber light source in which a small-size solid light source and an optical fiber are combined has been developed. This fiber light source is used as a lighting apparatus which irradiates light from a front end of a fine structure.

As an example of such lighting apparatus, a fiber light source apparatus (light outputting apparatus) in which a solid light source is used has been proposed in Japanese Patent Application Laid-open Publication No. 2009-3228 (FIG. 17A, FIG. 17B, and FIG. 17C). FIG. 17A is a diagram showing a schematic structure of an area around a wavelength converting member of the conventional lighting apparatus, FIG. 17B is a front view showing a structure of a spacer used in the lighting apparatus of FIG. 17A, and FIG. 17C is a diagrammatic perspective view showing a structure of the spacer used in the lighting apparatus of FIG. 17A.

In the fiber light source apparatus disclosed in Japanese Patent Application Laid-open Publication No. 2009-3228, a light guiding member (an optical fiber) 920 is connected to a small size solid light source, and a wavelength converting member (a fluorescent substance) 940 is installed at a front end of the light guiding member 920. The light guiding member 920 is installed on a holding member 930, and a spacer 950 is installed between the light guiding member 920 and the wavelength converting member 940. The spacer 950 has a through hole 950c, and a metallic thin film 950a is formed on a surface of the spacer 950. In this fiber light source apparatus, by making light launched rearward which has launched from the wavelength converting member 940 toward the light guiding member 920, reflect by a reflecting portion made of the metallic thin film 950a provided on the surface of the spacer 950 the light launched toward the light guiding member 920 is returned to the wavelength converting member 940, thereby increasing an amount of light illuminated which is subjected to wavelength conversion.

The fiber light source apparatus in Japanese Patent Application Laid-open Publication No. 2009-3228 which includes a light outputting element, a guiding member which guides light from the light outputting element, a holding member which is installed on at least an emerging-side end portion of the light guiding member, and a wavelength converting member which is provided on an emerging side of the light guiding member, and which absorbs at least a part of the light from the light outputting element, and converts to a light of different wavelength. In this structure, a spacer which reflects light launched rearward from the wavelength converting member is installed between the holding member or the light guiding member, and the wavelength converting member. According to such structure, since it is possible to reduce a loss of light generated by the light reflected at or generated from the wavelength converting member being incident on an end surface of the holding member, it is possible to improve an output of light. Consequently, by providing a means which reflects the light in a direction in which the light is to be output, it is possible to improve brightness of light launched rearward which could hitherto not be used effectively.

However, in the abovementioned fiber light source apparatus, an arrangement is made such that an entire surface of an opening on an emerging side of the spacer 950 is covered by the wavelength converting member 940. Therefore, the light launched rearward which is reflected at a reflecting portion made of the metallic thin film 950 formed on the surface of the spacer 950 passes through the wavelength converting member 940 and is output to outside. However, since the wavelength converting member 940 has a self-absorbing property, the wavelength converting member 940 absorbs a part of the light subjected to wavelength conversion by the wavelength converting member 940, and accordingly, an amount of the wavelength-converted light which is launched to outside is reduced. Consequently, in the structure of the abovementioned fiber light source apparatus, the wavelength-converted light from the wavelength converting member 940 cannot be used sufficiently, and light extraction efficiency is not improved as it has been expected to be.

SUMMARY OF THE INVENTION

The present invention is made in view of the abovementioned circumstances, and an object of the present invention is to provide a lighting apparatus in which, a light extraction efficiency of wavelength converted light having the wavelength converted by the wavelength converting member, is improved.

A lighting apparatus according to the present invention includes an excitation-light source, a light guiding member which guides excitation light which has launched from the excitation-light source, and a wavelength converting unit which converts a wavelength of the excitation light guided by the light guiding member to a desired wavelength, and the wavelength converting unit includes at least a holder and a wavelength converting member, and the holder has a through hole, and an opening on one side of the through hole is a holder incidence opening which is connected to an excitation-light emerging end of the light guiding member, an opening on the other side of the through hole is a holder launch opening through which the wavelength-converted light is irradiated, and at least a part of an inner surface of the through hole has a reflecting portion, and the wavelength converting member has a first surface which is facing the excitation-light emerging end of the light guiding member, and a second surface which is an opposite side of the first surface, and the first surface is isolated from the excitation-light emerging end of the light guiding member, and the second surface is disposed near the holder launch opening, and an area of the second surface is smaller than an area of the holder launch opening, and a wavelength-converted light propagating area is formed, which is in continuity from the excitation-light emerging end of the light guiding member up to the second area, and which is for making the wavelength-converted light which has been reflected at least once at the reflecting portion launch from the second area when an area of the holder launch opening which is occupied by the second surface is let to be a first area, and an area of the holder launch opening other than the first area is let to be a second area.

In the lighting apparatus according to the present invention, it is preferable that the wavelength converting member and the inner surface of the through hole of the holder are disposed to be mutually isolated, and the wavelength-converted light propagating area is provided between the wavelength converting member and the inner surface of the through hole of the holder.

In the lighting apparatus according to the present invention, it is preferable that the wavelength-converted light propagating area is formed by filling a light transmitting member which transmits the wavelength-converted light and the excitation light.

In the lighting apparatus according to the present invention, it is preferable that the light transmitting member is one of a glass and a resin.

In the lighting apparatus according to the present invention, it is preferable that a gap layer having a refractive index smaller than a refractive index of the light transmitting member is provided on at least a part of an area between the light transmitting member and the inner surface of the through hole in the holder.

In the lighting apparatus according to the present invention, it is preferable that the gap layer is a space, and the light transmitting member and the inner surface of the through hole of the holder are partly isolated.

In the lighting apparatus according to the present invention, it is preferable that the inner surface of the through hole of the holder is a tapered surface having a shape of a truncated cone which is widened from the holder incidence opening toward the holder launch opening.

In the lighting apparatus according to the present invention, it is preferable that the wavelength converting member is disposed such that the first surface is in contact with the light transmitting member.

In the lighting apparatus according to the present invention, it is preferable that a side surface of the wavelength converting member is surrounded by the light transmitting member.

In the lighting apparatus according to the present invention, it is preferable that the second surface of the wavelength converting member is surrounded by the light transmitting member.

In the lighting apparatus according to the present invention, it is preferable that alight shielding filter which shields the excitation light is provided on at least a part of an area of the wavelength-converted light propagating area, which is facing the holder launch opening.

In the lighting apparatus according to the present invention, it is preferable that the light shielding filter is a wavelength selecting reflective film which reflects the excitation light and transmits the wavelength-converted light.

In the lighting apparatus according to the present invention, it is preferable that the wavelength converting member is a circular cylindrical, of which the first surface is substantially circular, and a size of the first surface of the wavelength converting member is larger than a beam spot which the excitation light launched from the optical fiber forms on a flat surface including the first surface of the wavelength converting member.

In the lighting apparatus according to the present invention, it is preferable that the light guiding member is an optical fiber having a numerical aperture Fna, and the wavelength-converted light propagating area is filled with a resin having a refractive index nr, and when a central axial distance on the optical fiber between an emerging end of the optical fiber and the first surface of the wavelength converting member is D, a radius Rp of the circular-shaped first surface of the wavelength converting member satisfies the following expression (1)

$$Rp \geq D \cdot \tan(\arcsin(Fna/nr)) \quad (1)$$

In the lighting apparatus according to the present invention, it is preferable that the inner surface of the through hole in the holder is a tapered surface having a shape of a truncated cone which is widened from the holder incidence opening toward the holder launch opening, and a taper angle $\phi$ between the central axial direction of the optical fiber and the tapered surface satisfies the following expression (2).

$$\phi > \arctan(Rp/D) \quad (2)$$

In the lighting apparatus according to the present invention, it is preferable that the wavelength converting member is fixed to the holder by a holding member, and a part of the wavelength-converted light propagating area is a space.

In the lighting apparatus according to the present invention, it is preferable that the holding member is a transparent plate through which transmits the wavelength-converted light.

In the lighting apparatus according to the present invention, it is preferable that the holding member has an opening in a part thereof, and the wavelength-converted light propagating area is a space which is in continuity from the holder incidence end up to the holder emerging end.

A lighting apparatus according to the present invention includes
    alight source from which light-source light is launched,
    a first optical member which converts the light-source light to a wavelength-converted light having a desired wavelength and from which the wavelength-converted light is launched toward the light source, and
    a second optical member from which the wavelength-converted light is launched toward the first optical member,
        wherein the first optical member includes
        a first portion which configures a first area on which the wavelength-converted light launched from the second optical member is incident, and
        a second portion which configures a border of a second area on which the wavelength-converted light launched from the second optical member is not incident.

DETAILED DESCRIPTION OF THE PREFERRED EMBODIMENTS

Exemplary embodiments of a lighting apparatus according to the present invention will be described below in detail by referring to the accompanying diagrams. However, the present invention is not restricted to the embodiments described below.

First Embodiment

Figure 1:
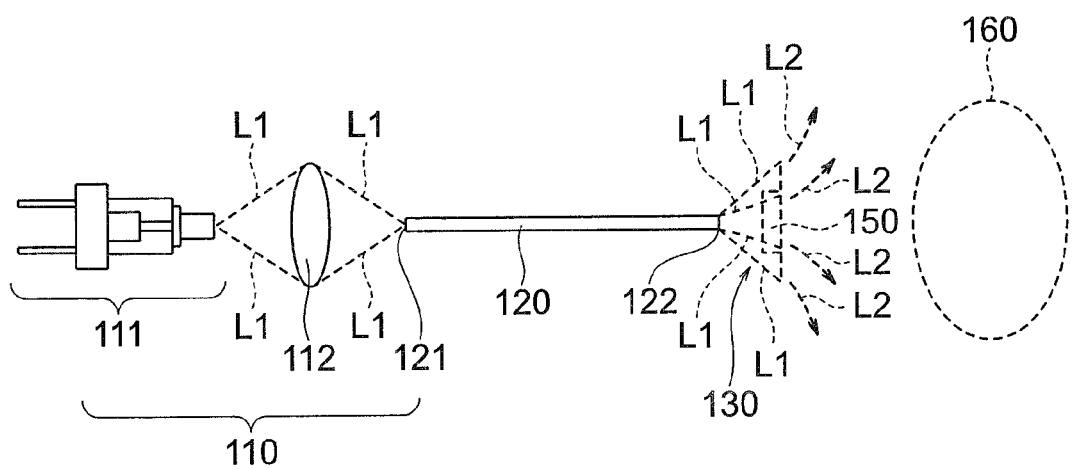
FIG. 1 is a diagram showing a schematic structure of a lighting apparatus according to a first embodiment of the present invention.
Figure 2:
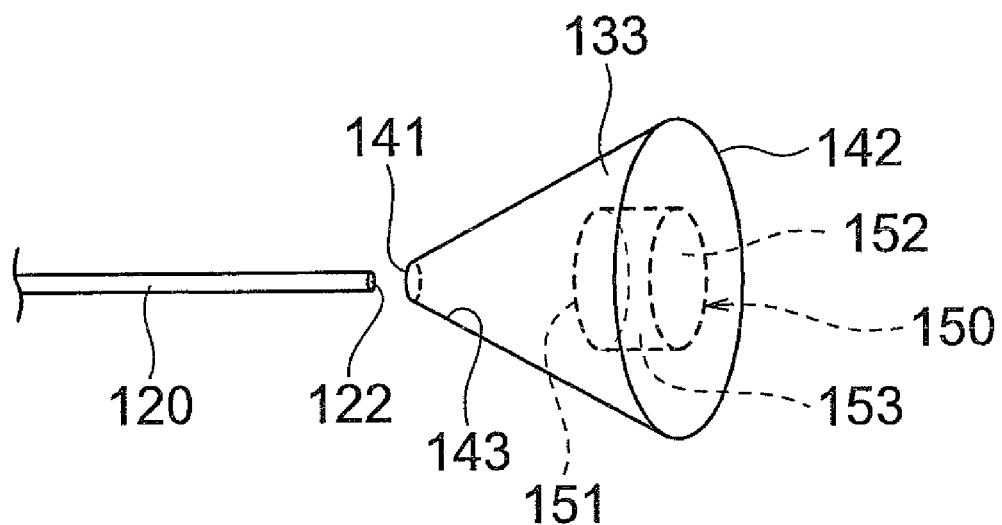
FIG. 2 is a diagrammatic perspective view showing in an enlarged form a wavelength converting unit and a light guiding member in FIG. 1.
Figure 3:
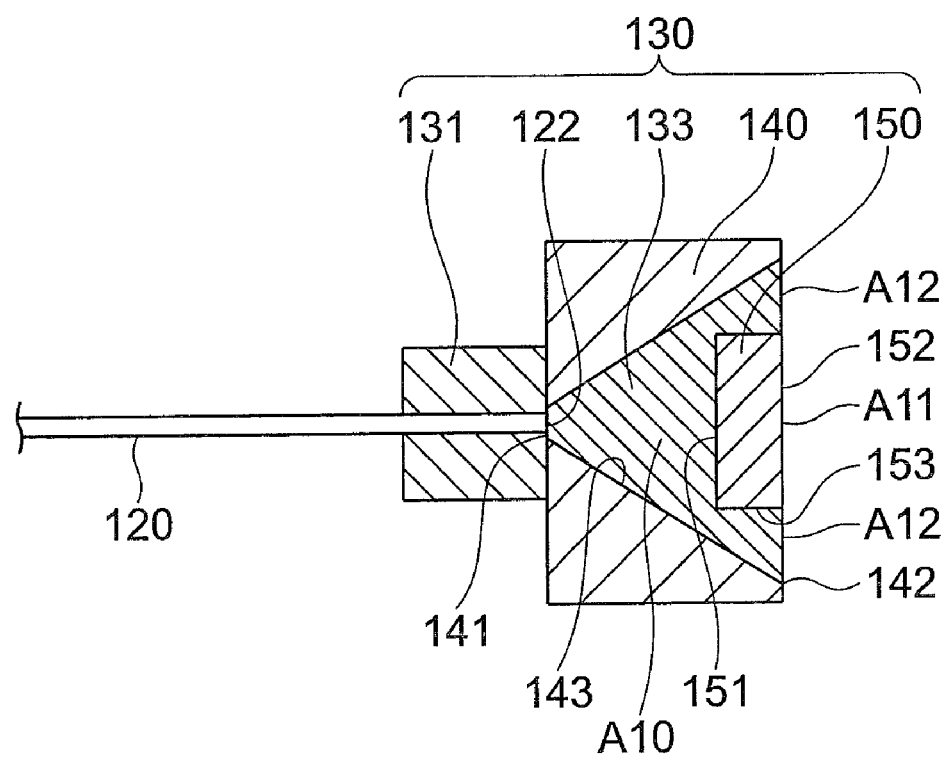
FIG. 3 is a cross-sectional view showing in an enlarged form the wavelength converting unit and the light guiding member in FIG. 1.

A lighting apparatus according to a first embodiment of the present invention will be described below by using diagrams from FIG. 1 to FIG. 4. FIG. 1 is a diagram showing a schematic structure of the lighting apparatus according to the first embodiment. FIG. 2 is a diagrammatic perspective view showing in an enlarged form a wavelength converting unit and a light guiding member in FIG. 1. FIG. 3 is a cross-sectional view showing in an enlarged form the wavelength converting unit and the light guiding member in FIG. 1. In FIG. 1 and FIG. 2, some of the members are not indicated. Moreover, in FIG. 2, a light guiding member 120 and a holder incidence opening 141 of a holder 140 are shown to be isolated for the sake of explanation.

As shown in FIG. 1, the lighting apparatus according to the first embodiment is divided mainly into a light source section 110, a light guiding member 120, and a wavelength converting unit 130. Excitation light which has launched from the light source section 110 is guided to the light guiding member 120, and is irradiated to a wavelength converting member 150 which is inside the wavelength converting unit 130. A detailed structure of each section will be described below.

The light source section 110 includes a semiconductor laser light source 111 (excitation-light source), a collective lens 112, and an incidence end 121 of the light guiding member 120. The semiconductor laser light source 111, the collective lens 112, and the incidence end 121 of the light guiding member 120 are fixed at respective positions (refer to FIG. 1) such that excitation light L1 which is launched from the semiconductor laser light source 111 is collected at the collective lens 112, and made to be incidence efficiently on the light guiding member 120.

A multi-mode optical fiber having a core diameter of 50 μm and a numerical aperture $F_{NA}=0.2$ is to be used for the light guiding member 120.

The wavelength converting unit 130 includes an excitation-light emerging end 122 of the light guiding member 120, the wavelength converting member 150, a light transmitting member 133 (which also functions as a holding member holding the wavelength converting member 150), the holder 140, and a ferrule 131, and converts a wavelength of the excitation light L1 which is guided by the light guiding member 120, converting the excitation light L1 to a wavelength-converted light L2 of a desired wavelength.

It is preferable that the wavelength converting unit of the present invention includes at least a holder and a wavelength converting member. However, in the first embodiment, an example of a wavelength converting unit which includes an excitation-light emerging end 122, the wavelength converting member 150, the light transmitting member 133, the holder 140, and the ferrule 131, is shown.

The holder 140 has at an interior thereof, a through hole which is in continuity from a holder incidence opening 141 on which the excitation light L1 is incidence, up to a holder launch opening 142 through which irradiated light (wavelength-converted light L2) is launched to an exterior. The through hole in the holder 140 has a tapered shape which widens gradually from the holder incidence opening 141 toward the holder launch opening 142, and a reflecting portion 143 is formed on a tapered surface which is an inner surface of the through hole.

It is preferable that the reflecting portion of the present invention is formed not on the entire inner surface of the through hole of the holder but only on a part thereof. However, the first embodiment is an example in which, the reflecting portion 143 is formed on the entire inner surface of the through hole in the holder 140.

The wavelength converting member 150 has a circular cylindrical shape, and has a first surface 151 which is facing the excitation-light emerging end 122 of the light guiding member 120, a second surface 152 which is opposite to the first surface 151, and a side surface 153 which is between the first surface 151 and the second surface 152. Moreover, the first surface 151 is isolated from the excitation-light emerging end 122.

As shown in FIG. 3, the light transmitting member 133 and the wavelength converting member 150 are disposed at an interior of the through hole in the holder 140, or in other words, at an inner side of the reflecting portion 143.

The light transmitting member 133 is filled inside the through hole in the holder 140 to surround the side surface 153 and the first surface 151 of the wavelength converting member 150. In other words, the light transmitting member 133 has a shape of a truncated cone with the holder incidence opening 141 as a top surface and the holder launch opening 142 as a bottom surface thereof. Moreover, the light transmitting member 133 has a property which allows both the excitation light L1 and the wavelength-converted light L2 launched from the wavelength converting member 150 to be transmitted through the light transmitting member 133.

The second surface 152 of the circular cylindrical shaped wavelength converting member 150 has an area smaller than the holder launch opening 142, and is disposed almost concentrically with the holder launch opening 142. By disposing the second surface 152 of the wavelength converting member 150 in such manner, the wavelength converting member 150 does not come in contact with the inner surface of the through hole of the holder 140. In other words, the second surface 152 is disposed to be isolated from the holder launch opening 142 which is an end portion of the reflecting portion 143, throughout circumference thereof. Moreover, the second surface 152 forms a part of an opening surface of the holder launch opening 142. Here, a thickness of the wavelength converting member 150 is set to be such that the excitation light L1 is converted to the wavelength-converted light L2 of sufficient wavelength.

The light transmitting member 133 forms a wavelength-converted light propagating area A10 which is in continuity from the excitation-light emerging end 122 of the light guiding member 120 up to a second area A12, and which is for making the wavelength-converted light L2 which has been reflected at least once at the reflecting portion 143, launch from the second area A12, when an area of the holder launch opening 142 occupied by the second area 152 is let to be a first area A11 (FIG. 3) and an area of the holder launch opening 142 other than the first area A11 is let to be the second area A12 (FIG. 3).

An outer periphery toward the excitation-light emerging end 122 of the light guiding member 120 is held by the ferrule 131, and the excitation-light emerging end 122 is connected such that the excitation light L1 is incident on the holder incidence opening 141 of the holder 140. More concretely, the excitation-light emerging end 122 of the light guiding member 120 is connected near a center of the holder incidence opening 141 of the holder, or in other words, near a center of an upper surface of a truncated cone of the light transmitting member 133.

Relative positions of the excitation-light emerging end 122 of the light guiding member 120 and the wavelength converting member 150 are set to be such that almost all the excitation light L1 launched from the excitation-light emerging end 122 of the light guiding member 120 is irradiated to the first surface 151 of the wavelength converting member 150. At this time, an arrangement is made such that a beam spot which the excitation light L1 launched from the light guiding member 120 forms on a flat surface including the first surface 151 of the wavelength converting member 150 becomes smaller than the first surface 151 of the wavelength converting member 150. Here, the beam spot is defined as an area having a light intensity higher than $1/e^2$ for the maximum intensity of the excitation light, where, e is Napier's constant as a base of natural logarithm.

Here, a preferable example of a shape and a material of each member will be described.

A preferable taper angle of the inner surface of the through hole of the holder 140 with respect to a central axis 120c of the light guiding member 120 is 11 degrees. It is preferable that the wavelength converting member 150 is circular cylindrical shaped with a radius of 0.17 mm and a thickness of 0.5 mm. The multi-mode optical fiber mentioned above is used for the light guiding member 120.

It is preferable to form the light transmitting member 133 by a glass or a resin. For instance, when a silicone resin material (refractive index 1.4) which transmits the excitation light L1 and the wavelength-converted light L2 is used, it is possible to have both light stability and workability. Whereas, when a glass is used for the light transmitting member 133, it is possible to improve a light-transmission loss, the light stability, and heat resistance. An example of a material for the wavelength converting member 150 is a material which is obtained by dispersing a fluorescent material in a powder form having an average particle size of 8 μm with a concentration of 10 wt % in a silicone resin, and then hardening the resin by curing.

[Operation]

A behavior of the excitation light L1 from the light source section 110 will be described below.

Firstly, the excitation light L1 launched from the semiconductor laser light source 11, upon passing through the collective lens 112, is incident highly efficiently through the incidence end 121 on the light guiding member 120.

The excitation light L1 incident on the light guiding member 120 is guided to an interior of the light guiding member 120, and is launched through the excitation-light emerging end 122 of the light guiding member 120 toward the light transmitting member 133. At this time, the excitation light L1 is launched at a flare angle corresponding to the numerical aperture (NA) of the light guiding member 120 and a refractive index of the light transmitting member 133.

The excitation light L1 transmitted through the light transmitting member 133 and is irradiated to the first surface 151 of the wavelength converting member 150. At this time, since an arrangement is made such that the size of the first surface 151 of the wavelength converting member 150 is larger than the beam spot which the excitation light L1 forms on the flat surface including the first surface 151 of the wavelength converting member 150, a substantial portion of the excitation light L1 is irradiated to the wavelength converting member 150. As a result, there is almost no excitation light which is launched to an outside directly without passing through the wavelength converting member 150.

The excitation light L1 is irradiated to the wavelength converting member 150 and is converted to the wavelength-converted light L2 having a wavelength different from a wavelength of the excitation light L1. The wavelength-converted light L2 is launched in all directions irrespective of a direction of incidence. A part of the wavelength-converted light L2 is irradiated to an irradiation object 160 at an exterior, through the holder launch opening 142, and another part thereof is launched toward the light transmitting member 133 from the side surface 153 or the first surface 151 of the wavelength converting member 150.

The wavelength-converted light L2 which has launched toward the light transmitting member 133 is reflected by the reflecting portion 143 which is the inner surface of the through hole in the holder 140. Since the reflecting portion 143 is a tapered surface opening toward the launch side of the irradiated light, or in other words, toward the irradiation object 160, a component of the wavelength-converted light L2 which is reflected at the reflecting portion 143 traveling toward the launch side of the irradiated light increases as compared to (a component traveling in) the original direction of traveling.

More elaborately, a part of the wavelength-converted light L2 reflected at the reflecting portion 143 is redirected toward the reflecting portion 143, and another part thereof is directed toward the wavelength converting member 150, and a remaining part of the wavelength-converted light L2, upon passing through the light transmitting member 133, is irradiated to the irradiation object 160 outside, through the holder launch opening 142.

A part of the wavelength-converted light L2 which is reflected once at the reflecting portion 143, and is relaunched toward the reflecting portion 143 undergoes the abovementioned behavior repeatedly and is redirected further to the reflecting portion 143, and another part thereof is directed toward the wavelength converting member 150, and the remaining part of the wavelength-converted light L2 is launched outside through the holder launch opening 142. The wavelength-converted light L2 directed toward the reflecting portion 143 and the wavelength converting member 150 undergoes the abovementioned process repeatedly thereafter.

[Regarding Parameters of Each Member]

Figure 4:
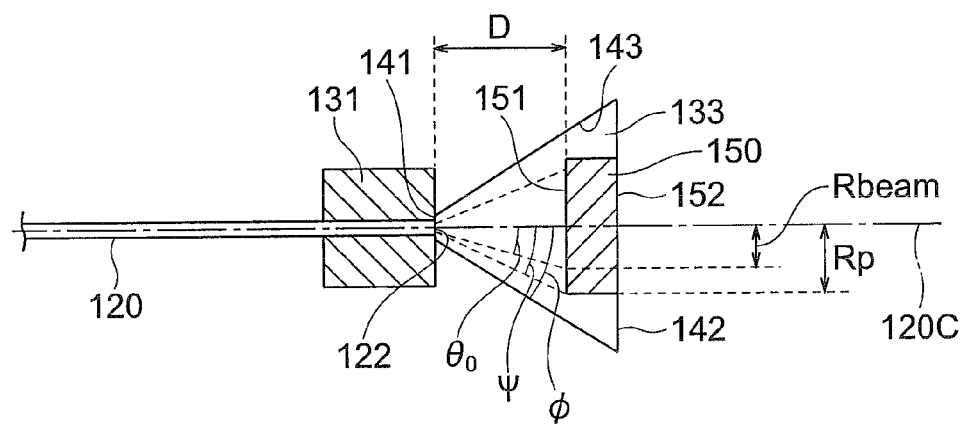
FIG. 4 is a cross-sectional view showing in an enlarged form the wavelength converting unit and the light guiding member in FIG. 1, and is a diagram showing parameters of each member.

Next, parameters of each member will be described by referring to FIG. 4. FIG. 4 is a cross-sectional view showing in an enlarged form the wavelength converting unit and the light guiding member in FIG. 1, and is a diagram showing parameters of each member.

For making an arrangement such that almost the entire excitation light L1 launched from the excitation-light emerging end 122 of the light guiding member 120 is irradiated to the first surface 151 of the wavelength converting member 150, each member is to be structured as follows.

When the numerical aperture of the light guiding member 120 is let to be Fna, the excitation light L1 which has been guided from the light guiding member 120 is spread according to a refractive index nr of the light transmitting member 133 and the numerical aperture Fna from the excitation-light emerging end 122 of the light guiding member 120 and launched into the light transmitting member. When the flare angle is let to be $\theta_0$, $\theta_0$ can be obtained by the following expression (3).

$$\theta_0 = \arcsin(Fna/nr) \quad (3)$$

Here, when an optical fiber of numerical aperture Fna=0.2 is used as the light guiding member 120 and a silicone resin of refractive index nr=1.4 is used as the light transmitting member 133, the flare angle $\theta_0$ is about 8 degrees.

Moreover, the wavelength converting member 150 is a circular cylindrical shaped member with a center thereof coinciding with a central axis of the light guiding member 120, having the first surface 151 which is substantially perpendicular to the central axis. In other words, the wavelength converting member 150 is a circular cylinder disposed to be concentric with the light guiding member 120. When a distance D on a central axis of the light guiding member 120 of the excitation-light emerging end 122 of the light guiding member 120 and the first surface 151 of the wavelength converting member 150 is let to be 1.0, and the beam spot of the excitation light formed on the flat surface including the first surface 151 of the wavelength converting member 150 is let to be substantially circular shaped with the central axis of the light guiding member 120 as a center, and let to have a radius Rbeam, the radius Rbeam can be calculated by the following expression (4).

$$R\text{beam} = D \times \tan(\theta_0) \quad (4)$$

When the abovementioned values of the expression (4) are applied, an irradiation radius Rbeam is Rbeam=0.14 mm.

Generally, an optical fiber is used for the light guiding member 120, and a core diameter thereof (a diameter of light launched) is in a range of a few microns to a few hundred μm. Here, in a case where the core diameter of the light guiding member 120 is not negligible with respect to the radius Rbeam which is calculated by expression (2), when the radius of an area irradiated by the excitation light time is let to Rbeam 2, it is desirable to calculate Rbeam 2 by expression (5). In the first embodiment, a fiber having a core diameter of Rf=50 μm is to be used.

$$R\text{beam } 2 = Rf/2 + D \times \tan(\theta_0) = Rf/2 + R\text{beam} \quad (5)$$

When the abovementioned values are applied in expression (5), Rbeam 2 is Rbeam 2=0.17 mm.

As it has been described above, the core diameter of the light guiding member 120 not being negligible, the description will be carried forward using expression (5).

The beam spot of the excitation light on the flat surface having distance D from the excitation-light emerging end of the light guiding member 120 is circular, having radius Rbeam 2=0.17 mm. Therefore, when the first surface 151 of the wavelength converting member 150 is substantially same as or slightly larger than radius of 0.17 mm, almost the entire excitation light L1 launched from the light guiding member 120 is irradiated to the first surface 151 of the wavelength converting member 150.

Generally, when a relationship in each of the following expression (1) and expression (1') is satisfied, it is possible to make the first surface 151 of the wavelength converting member 150 larger than the beam spot of the excitation light L1 launched from the light guiding member 120. In other words, when the radius of the first surface 151 of the wavelength converting member 150 is let to be Rp, it is preferable to make an arrangement such that the following relationships are satisfied.

$$Rp \geq R\text{beam} = D \times \tan(\arcsin(Fna/nr)) \quad (1)$$

$$Rp \geq R\text{beam } 2 = Rf/2 + D \times \tan(\arcsin(Fna/nr)) \quad (1')$$

Here, expression (1) is a case in which, the core diameter of the optical fiber can be neglected, and expression (1') is a case in which, the core diameter of the optical fiber cannot be neglected.

Moreover, when the size of the first surface 151 of the wavelength converting member 150 is smaller than the beam spot which is irradiated to the flat surface including the first surface 151 of the wavelength converting member 150, the excitation light L1 is launched outside upon passing through the light transmitting member 133 and the holder launch opening 142, and not passing through the wavelength converting member 150. Taking into consideration a proportion of the wavelength-converted light L2 with the excitation light L1, or in other words, an efficiency of the excitation light L1, the excitation light L1 which is not used increases. Therefore, it is desirable to let the relationship as in expression (1) or expression (1'), or in other words, to make an arrangement such that almost the entire excitation light L1 is irradiated to the first surface 151 of the wavelength converting member 150.

Next, the taper angle of the inner surface of the through hole in the holder 140 will be described below.

When the radius of the first surface 151 of the wavelength converting member 150 is Rp, an angle ψ which, a straight line connecting an edge of the first surface 151 of the wavelength converting member and the excitation-light emerging end 122 of the light guiding member 120 makes with the central axis of the light guiding member 120 is calculated by the following expression (6). In the first embodiment, since the wavelength converting member 150 and the reflecting surface 143 which is the inner surface of the holder 140 are isolated, the taper angle φ is required to be larger than the angle ψ calculated by expression (6). Consequently, to satisfy the relationship in expression (2), when the taper angle φ is set, it is possible to make an arrangement to have the wavelength-converted light propagating area.

$$\psi = \arctan(Rp/D) \quad (6)$$

$$\phi > \psi = \arctan(Rp/D) \quad (2)$$

In the first embodiment, although an optical fiber of NA=0.2 is used as the light guiding member 120, the present invention is not restricted to the abovementioned value N. When NA is higher than 0.2, the excitation light L1 launched from the semiconductor laser light source 111 which is an excitation-light source can be guided efficiently to the wavelength converting unit 130. However, when the light guiding member 120 having the value of NA too high is used, since the flare angle of the excitation light L1 launched from the excitation-light emerging end 122 of the light guiding member 120 becomes substantial, it is necessary to make large the size of the wavelength converting member 150, and also the taper angle φ of the inner surface of the holder 140 has to be made wider (substantial).

By using semiconductor laser light source 111 for the excitation-light source, since it is possible to make the excitation light L1 incident, and be guided sufficiently without using the light guiding member 120 of that much large size, in a case of an application in which it is desirable to make the size of the wavelength converting unit 130 small, it is preferable that NA of the light guiding member 120 is not excessively large. Concretely, when NA becomes 0.5 or more, an angle of launch $\theta_0$ of the excitation light L1 when the refractive index of the light transmitting member 133 is 1.5 becomes 20 degrees or more.

In the description made so far, the beam spot of the excitation light L1 is obtained (calculated) by using the numerical aperture Fna of the optical fiber which is the light guiding member 120. However, depending on a state of the excitation-light emerging end 122 of the light guiding member 120, an angle of incidence at the incidence end 121 of the light guided, and bending of the optical fiber, sometimes the angle of launch of the excitation light may have a flare wider than the angle of launch $\theta_0$ which is calculated from NA. In such a case, an area having intensity of $1/e^2$ and more with respect to a peak intensity of the excitation light which is launched from the light guiding member may be defined as an excitation-light irradiated area (an area irradiated by excitation light), and parameters of each member may be set.

[Action and Effect]

As it has been described above, a part of the wavelength-converted light launched from the side surface 153 and the first surface 151 of the wavelength converting member 150, without being incident once again on the wavelength converting member 150, is launched to the outside through the holder launch opening 142 upon passing through the wavelength-converted light propagating area. Since a reduction in an amount of light due to self-absorption of the wavelength converting member 150 is small, it is possible to realize a light source having a high light extraction efficiency for the wavelength-converted light. Particularly, the wavelength-converted light is launched with high proportion from the first surface 151 to which the excitation light is directly irradiated, as compared to the other surface. Apart of the wavelength-converted light L2 launched from the first surface 151 is launched to the wavelength-converted light propagating area which is disposed toward the light source section 110 by the wavelength converting member 150, and is irradiated to the irradiation object 160 at the exterior, without being incident on the wavelength converting member 150 up to the holder launch opening 142 upon being reflected at reflecting portion 143 and passed through the wavelength-converted light propagating area.

By making such an arrangement, it is possible to provide a lighting apparatus in which the efficiency of the excitation light L1 is high as well as the light extraction efficiency for wavelength-converted light L2 is high.

Consequently, it is possible to make a part of the wavelength-converted light L2 which has launched from the wavelength converting member 150 launch from an irradiated-light launch area without being made to be incident again on the wavelength converting member 150. Moreover, out of the wavelength-converted light L2 launched from the wavelength converting member 150, for light launched rearward toward the semiconductor laser light source 111 to be launched outside without being incident once again on the wavelength converting member 150, the wavelength-converted light propagating area which is in continuity from the excitation-light incidence end up to the irradiated-light emerging end is provided. Accordingly, since a part of the light launched rearward which has launched from the wavelength converting member 150 toward the semiconductor laser light source 111 is launched outside upon passing through the wavelength-converted light propagating area, it is possible to reduce loss due to self-absorption. Therefore, it is possible to provide a lighting apparatus in which the light extraction efficiency for the wavelength-converted light L2 is improved.

Second Embodiment

Figure 5:
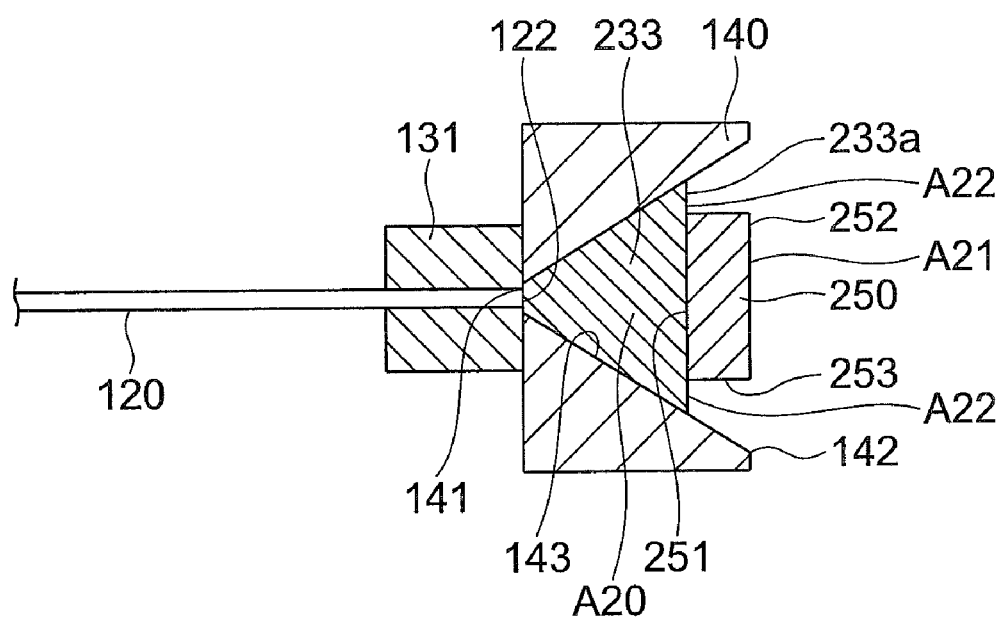
FIG. 5 is a cross-sectional view showing in an enlarged form a wavelength converting unit and a light guiding member of a lighting apparatus according to a second embodiment of the present invention.

Next, a lighting apparatus according to a second embodiment of the present invention will be described below by using FIG. 5. FIG. 5 is a cross-sectional view showing in an enlarged form a wavelength converting unit and a light guiding member of the lighting apparatus according to the second embodiment of the present invention. Only points which differ from the first embodiment will be described below, and description of portions which are same will be omitted. In the second embodiment, a point that a wavelength converting member 250 and a light transmitting member 233 (which also functions as a holding member holding the wavelength converting member 250) are connected only at a first surface 251 of the wavelength converting member 250, is different from the first embodiment. The rest of the structure is similar to the lighting apparatus according to the first embodiment, and same reference numerals are used for the members which are same as in the first embodiment.

The light transmitting member 233 has a shape of a truncated cone, and a surface 233a on an irradiated-light launch side makes contact only with the first surface 251 of the wavelength converting member 250. Moreover, a side surface 253 and a second surface 252 of the wavelength converting member 250 do not make a contact with the light transmitting member 233, and are exposed to an outside. Here, the wavelength converting member 250 has a similar shape as the wavelength converting member 150 of the first embodiment.

Here, a wavelength-converted light propagating area A20 is formed, which is in continuity from the excitation-light emerging end 122 of the light guiding member 120 up to a second area A22, and which is for making the wavelength-converted light L2 which has been reflected at least once at the reflecting portion 143, launch from the second area A22, when an area of the holder launch opening 142 occupied by the second surface 252 is let to be a first area A21, and an area of the holder launch opening 142 other than the first area A21 is let to be the second area A22.

[Action and Effect]

In the lighting apparatus of the first embodiment, as shown in FIG. 3, since the wavelength converting member 150 is arranged such that the first surface 151 and the side surface 153 thereof are embedded in the light transmitting member 133, manufacturing steps such as providing a recess in the light transmitting member 133 in advance and inserting the wavelength converting member 150 in the recess, or installing the wavelength, converting member 150 in a space in advance and pouring a material such as a resin in the space made inside the through hole in the holder and hardening (curing) have been necessary. Whereas, in the lighting apparatus of the second embodiment, since the light transmitting member 233 with a simple truncated cone shape serves the purpose, manufacturing is comparatively easier, and the wavelength converting member 150 is only to be installed on a surface of the truncated cone, on the launch side of the irradiated light, and it can be created easily as compared to the lighting apparatus of the first embodiment.

By making the arrangement as described above, it is possible to provide comparatively easily a lighting apparatus having a high light extraction efficiency for the wavelength-converted light.

The rest of the structure, action, and effect are similar as in the first embodiment.

Third Embodiment

Figure 6:
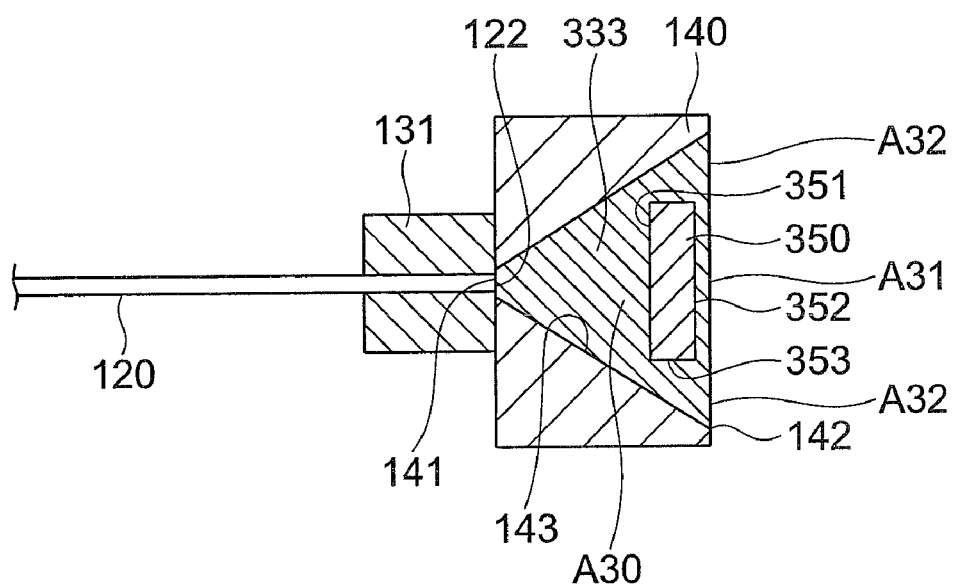
FIG. 6 is a cross-sectional view showing in an enlarged form a wavelength converting unit and a light guiding member of a lighting apparatus according to a third embodiment of the present invention.

Next, a lighting apparatus according to a third embodiment of the present invention will be described below by using FIG. 6. FIG. 6 is a cross-sectional view showing in an enlarged form a wavelength converting unit and light guiding member of the lighting apparatus according to the third embodiment. In the third embodiment, only points which differ from the first embodiment and the second embodiment will be described, and description of portions which are same will be omitted. In the third embodiment, a point that a wavelength converting member 350 is entirely embedded inside a light transmitting member 333 (which functions also as a holding member holding the wavelength converting member 350) is different from the first embodiment and the second embodiment. The rest of the structure is similar to the lighting apparatus according to the first embodiment, and same reference numerals are used for members which are same as in the first embodiment.

The light transmitting member 333 has a shape of a truncated cone, and includes the wavelength converting member 350 at the interior. The wavelength converting member 350 has a shape similar to the wavelength converting member 150 of the first embodiment, and is embedded entirely inside the light transmitting member 333. In other words, each of a first surface 351, a second surface 352, and a side surface 353 of the wavelength converting member 350 is inside the light transmitting member 333, and is not exposed to the outside.

Here, a wavelength-converted light propagating area A31 is formed, which is in continuity from the excitation-light emerging end 122 of the light guiding member 120 up to a second area A32, and which is for making the wavelength converted light L2 which has been reflected at least once at the reflecting portion 143, launch from the second area A32, when an area of the holder launch opening 142 occupied by the second surface 352 is let to be a first area A31, and an area of the holder launch opening 142 other than the first area A31 is let to be the second area A32.

[Action and Effect]

In the lighting apparatus of the first embodiment, as shown in FIG. 3, the second surface 152 of the wavelength converting member 150 is exposed to outside, and moreover, in the second embodiment, the second surface 252 and the side surface 253 of the wavelength converting member 250 are exposed to outside. Whereas, in the lighting apparatus of the third embodiment, since the wavelength converting member 350 is embedded entirely inside the light transmitting member 333, a possibility that the wavelength converting member 350 is detached becomes small.

Furthermore, by using a member having a comparatively higher thermal conductivity such as a glass for the light transmitting member 333, heat generated from the wavelength converting member 350 can be relieved easily.

By making the arrangement as described above, it is possible to provide a lighting apparatus having a high light extraction efficiency for the wavelength-converted light, and in which, the possibility of detachment of the wavelength converting member is small.

The rest of the structure, action, and effect are similar as in the first embodiment.

Fourth Embodiment

Figure 7:
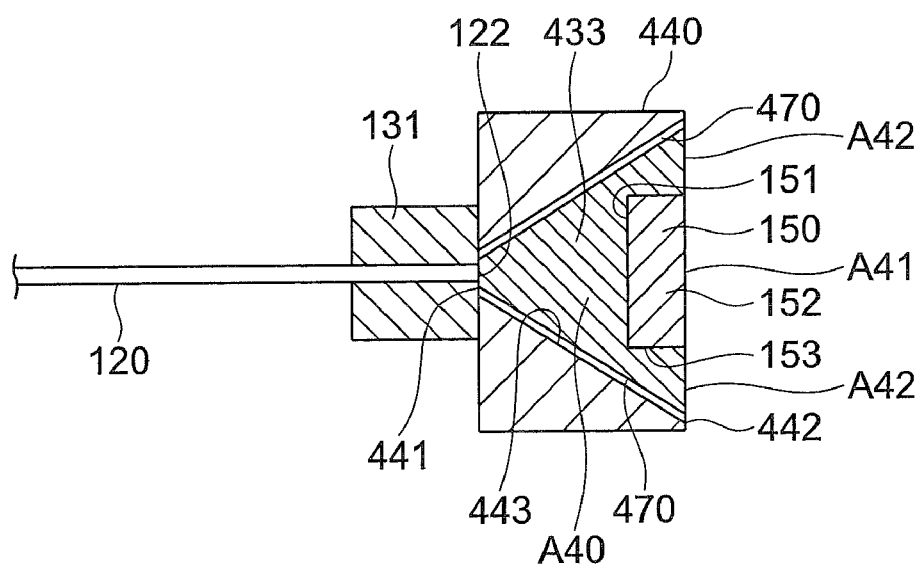
FIG. 7 is a cross-sectional view showing in an enlarged form a wavelength converting unit and a light guiding member of a lighting apparatus according to a fourth embodiment of the present invention.

Next, a lighting apparatus according to a fourth embodiment of the present invention will be described below by using FIG. 7. FIG. 7 is a cross-sectional view showing in an enlarged form a wavelength converting unit and a light guiding member of the lighting apparatus according to the fourth embodiment of the present invention. Only points which differ from embodiments from the first embodiment to the third embodiment will be described below, and description of portions which are same will be omitted. In the fourth embodiment, a point that a gap layer 470 having a refractive index smaller than a refractive index of the light transmitting members described above is provided between a light transmitting member 433 (which functions as a holding member holding the wavelength converting member 150) and a reflecting portion 443 which is formed on an inner surface of a through hole in a holder 440 differs from the embodiments from the first embodiment to the third embodiment. The rest of the structure is similar to the lighting apparatus of the first embodiment, and same reference numerals are used for members which are same as in the first embodiment.

[Structure]

Basic structure of the light transmitting member 433 is similar to the light transmitting member 133 of the first embodiment. However, because the gap layer 470 having a refractive index smaller than the refractive index of the light transmitting member 433 is provided between the light transmitting member 433 and the reflecting portion 443 which is formed on the inner surface of the through hole in the holder, the light transmitting member 433 is structured to be smaller by that amount. The gap layer 470 is a space, and the light transmitting member 433 is fixed to the holder 140 by a material such as a resin which is not shown in the diagram, near a holder incidence opening 441 and a holder launch opening 442.

Here, a wavelength-converted light propagating area A40 is formed, which is in continuity from the excitation-light emerging end 122 of the light guiding member 120 up to a second area A42, and which is for making the wavelength-converted light L2 which has been reflected at least once at the reflecting portion 443, launch from the second area A42, when an area of the holder launch opening 442 occupied by the second surface 152 is let to be a first area A41, and an area of the holder launch opening 442 other than the first area A41 is let to be the second area A42.

[Operation]

The wavelength-converted light L2 launched from the side surface 153 and the first surface 151 of the wavelength converting member 150, upon passing through the light transmitting member 433, advances toward an interface of the wavelength converting member 150 and the gap layer 470 which is a space. When the light transmitting member 433 is let to be a silicone resin having a refractive index nr=1.4 for instance, and the gap layer 470 which is a space is let to have a refractive index nair of 1.0, at this interface, when an angle of incidence α is larger than 45.5 degrees calculated by the following expression (7), there is a total reflection. Moreover, when the angle is smaller than 45.5 degrees, light is refracted at this interface and is launched to the gap layer 470, further, upon being reflected at the reflecting portion 143 provided on the inner surface of the through hole of the holder 140, the light reenters the interior of the light transmitting member 433.

$$\sin \alpha = nair/nr = 1/1.4 \quad (7)$$

[Action and Effect]

In the lighting apparatuses in the embodiments from the first embodiment to the third embodiment, the inner surface of the through hole of the holder is let to be the reflecting portion 143. Since the reflecting portion 143 is formed of a material such as silver and aluminum, reflectivity of about 98% is an upper limit, and practically the value is about 95%. Whereas, in the lighting apparatus of the fourth embodiment, since the interface of the light transmitting member 433 and the gap layer 470 is formed such that there is a total reflection when the angle of incidence α is larger than 45.5 degrees, the reflectivity of the wavelength-converted light L2 for a component with a higher frequency of reflection in particular, is improved. As a result, it is possible to improve the light extraction efficiency as compared to the light extraction efficiency in the embodiments from the first embodiment to the third embodiment.

By making the arrangement as described above, it is possible to provide a lighting apparatus having a high light extraction efficiency for the wavelength-converted light, and in which, the possibility of detachment of the wavelength converting member is small.

The rest of the structure, action, and effect are similar as in the first embodiment.

Modified Embodiment of Fourth Embodiment

In the lighting apparatus of the fourth embodiment, the gap layer 470 is let to be a space. However, in a modified embodiment of the fourth embodiment, a point that a resin layer having a low refractive index is provided in the gap layer 470 differs from the fourth embodiment.

A silicone resin having a refractive index of 1.3 for example, can be used as the resin layer.

By making such an arrangement, the light transmitting member 433 can be fixed more firmly to the holder 440, and it is possible to provide a lighting apparatus in which the light transmitting member 433 also including the wavelength-converting member 150 is not detached easily.

In the fourth embodiment and the modified embodiment of the fourth embodiment, an example in which the side surface 153 and the first surface 151 of the wavelength converting member 150 are surrounded by the light transmitting member 133 as shown in the first embodiment, is shown. However, without restricting to such an arrangement, the structure may be such that only the first surface 151 of the wavelength converting member 150 makes a contact with the light transmitting member 433 as in the lighting apparatus of the second embodiment. Moreover, even when all the three surfaces namely, the second surface 152, the side surface 153, and the first surface 151 of the wavelength converting member 150 are surrounded by the light transmitting member 433, it is possible to have the desired effect.

Fifth Embodiment

Figure 8:
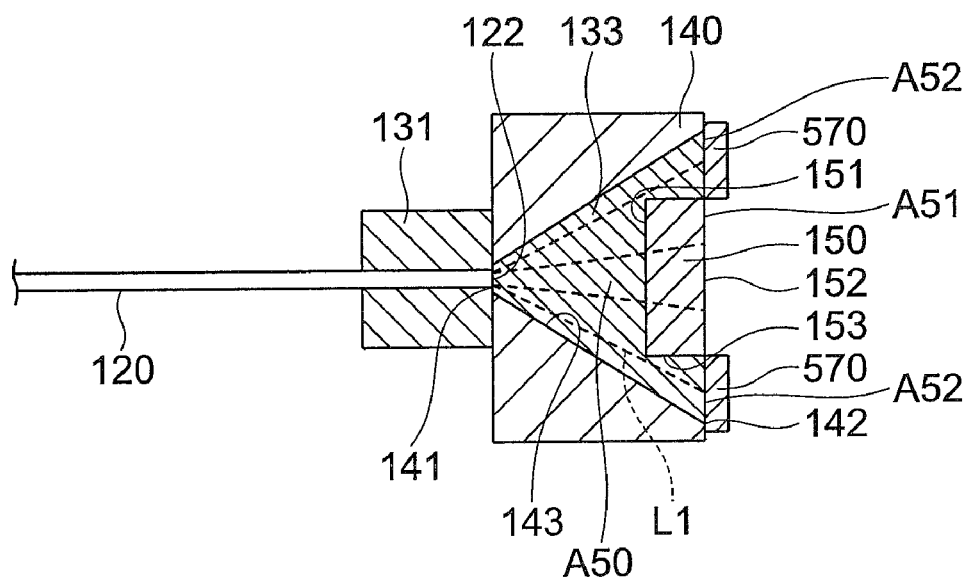
FIG. 8 is a cross-sectional view showing in an enlarged form a wavelength converting unit and a light guiding member of a lighting apparatus according to a fifth embodiment of the present invention.
Figure 9:
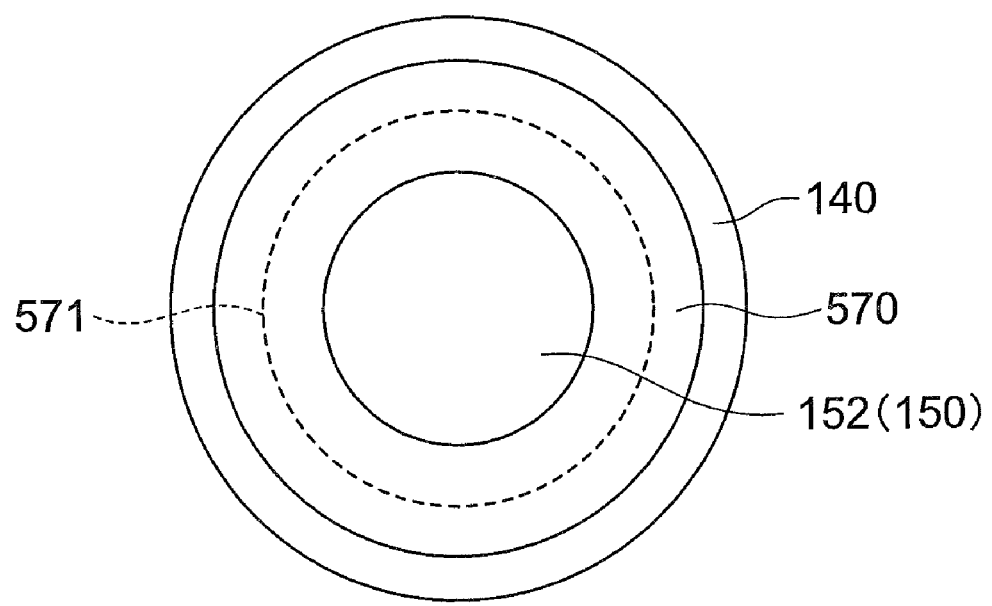
FIG. 9 is a front view showing a structure of the wavelength converting unit according to the fifth embodiment of the present invention.

Next, a lighting apparatus according to a fifth embodiment of the present invention will be described below by using FIG. 8 and FIG. 9. FIG. 8 is a cross-sectional view showing in an enlarged form a wavelength converting unit and a light guiding member of the lighting apparatus according to the fifth embodiment. FIG. 9 is a front view showing a structure of the wavelength converting unit according to the fifth embodiment. Only points which differ from the embodiments from the first embodiment to the fourth embodiment will be described below, and description of portions which are same will be omitted. In the fifth embodiment, a point that an excitation-light shielding film 570 (light shielding filter) which shields the excitation light L1 and does not allow to be launched outside is provided to the holder launch opening 142 differs from the embodiments from the first embodiment to the fourth embodiment. The rest of the structure is similar to the lighting apparatus according to the first embodiment, and same reference numerals are used for members which are same as in the first embodiment.

[Structure]

The excitation-light shielding film 570 is provided to an area of the holder launch opening 142 of the holder 140, excluding the second surface 152 of the wavelength converting member 150. Consequently, when the excitation-light shielding film 570 is viewed from the irradiated-light emerging side, it has a doughnut shape as shown in FIG. 9. As a result, the excitation light L1 launched from the light guiding member 120 is incident on the light transmitting member 133, and thereafter, is irradiated to the wavelength converting member 150. However, when the excitation light L1 is directed directly to the holder launch opening 142 without being irradiated to the wavelength converting member 150, the excitation light L1 is irradiated to the excitation-light shielding film 570.

It is preferable that the excitation-light shielding film 570 is a wavelength selecting filter (wavelength selecting reflecting film) through which the wavelength converted light L2 is transmitted, and is formed by a so-called film of multiple layers of a dielectric substance in which, transparent members having different refractive index are stacked. In the lighting apparatus of the fifth embodiment, an arrangement is made such that when the excitation light L1 is irradiated directly to the excitation-light shielding film 570 from the light guiding member 120, reflection intensity thereof is the maximum. The wavelength selecting filter of the film of multiple layers of a dielectric substance is formed by stacking dielectric substances having different refractive index at intervals. Reflection wavelength being different due to the stacking intervals, wavelength of high reflectivity differs due to a direction of incidence of light rays. Inversely, reflectivity for light of a certain wavelength changes according to an angle of incidence on the film of multiple layers of a dielectric substance. In the fifth embodiment, the interval of the film of multiple layers of a dielectric substance is set to be such that the reflection intensity is maximum when the excitation light is irradiated directly to a central circle 571 (dashed-line portion) which passes between an outer diameter and an inner diameter of the doughnut shape shown in FIG. 9.

Here, a wavelength-converted light propagating area A50 is formed which is in continuity from the excitation-light emerging end 122 of the light guiding member 120 up to a second area A52, and which is for making the wavelength-converted light L2 which has been reflected at least once at the reflecting portion 143, launch from the second area A52, when an area of the holder launch opening 142 occupied by the second surface 152 is let to be a first area A51, and an area of the holder launch opening 142 other than the first area A51 is let to be the second area A52.

[Operation]

Due to the manner in which the light guiding member 120 is turned, or, in a case where a connecting portion of the light bending member 120 and the holder 140 is shifted due to connecting error, when a diameter of the first surface 151 of the wavelength converting member 150 and a diameter of the beam spot of the excitation light L1 are close (are nearly the same), there is a possibility that the excitation light launched from the light guiding member 120 is directed directly toward the holder launch opening 442. In such a case, in the fifth embodiment, since the excitation-light shielding film 570 is provided on the holder launch opening 142, the excitation light L1 is not leaked to outside directly without being incident on the wavelength converting member 150.

Furthermore, in the fifth embodiment, the excitation-light shielding film 570 being a filter which reflects the excitation light L1 and transmits the wavelength-converted light L2, the excitation light which is irradiated to the excitation-light shielding film 570 is reflected toward the interior, and via the reflecting portion 143, a part thereof is irradiated to the wavelength converting member 150, and becomes the wavelength-converted light L2. Consequently, the excitation light L1 is not only prevented from being leaked to outside but also made to be reusable.

[Action and Effect]

By making such an arrangement, the excitation light is not leaked directly to outside, and moreover, the excitation light which is about to be leaked can be reused. Therefore, it is possible to provide a lighting apparatus which is more efficient.

The rest of the structure, action, and effect are similar as in the first embodiment.

First Modified Embodiment of Fifth Embodiment

Figure 10:
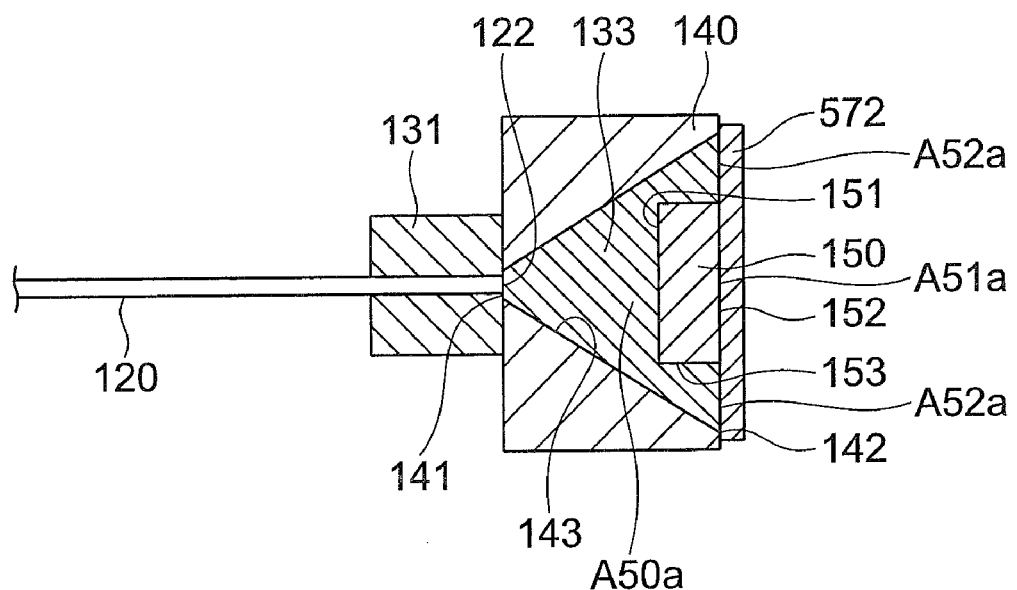
FIG. 10 is a cross-sectional view showing in an enlarged form a wavelength converting unit and a light guiding member of a lighting apparatus according to a first modified embodiment of the fifth embodiment of the present invention.

FIG. 10 is a cross-sectional view showing in an enlarged form a wavelength converting unit and a light guiding member of a lighting apparatus according to a first modified embodiment of the fifth embodiment. As shown in FIG. 10, in the first modified embodiment, an excitation-light shielding film 572 (holding member) which reflects the excitation light L1 and transmits the wavelength-converted light L2 is formed on an entire surface of the holder launch opening 142. In other words, the excitation-light shielding film 572 is formed also on a portion of the second surface 152 of the wavelength converting member 150.

Here, a wavelength-converted light propagating area A50a is formed, which is in continuity from the excitation-light emerging end 122 of the light guiding member 120 up to a second area A52a, and which is for making the wavelength-converted light L2 which has been reflected at least once at the reflecting portion 143, launch from the second area A52a, when an area of the holder launch opening 142 occupied by the second surface 152 is let to be a first area A51a, and an area of the holder launch opening 142 other than the first area A51a is let to be the second area A52a.

By making such an arrangement, the excitation light L1 which has launched to outside upon being transmitted, without being converted to the wavelength-converted light L2 by the wavelength converting member 150 can be returned by reflecting once again toward the wavelength converting member 150. Therefore, an amount of the excitation light L1 which is launched to outside becomes sufficiently small, and also the efficiency of the excitation light L1 can be improved further. Moreover, since the excitation-light shielding film 572 is formed on the entire surface of the holder launch opening 142, a patterning of the excitation-light shielding film 572 is unnecessary, thereby making the film formation easy. As it has been described above, according to the first modified embodiment of the fifth embodiment, it is possible to provide a lighting apparatus which is easy to make, and in which, in addition to the merit of the fifth embodiment, the excitation light can not get mixed easily with the launched light.

Second Modified Embodiment of Fifth Embodiment

Figure 11:
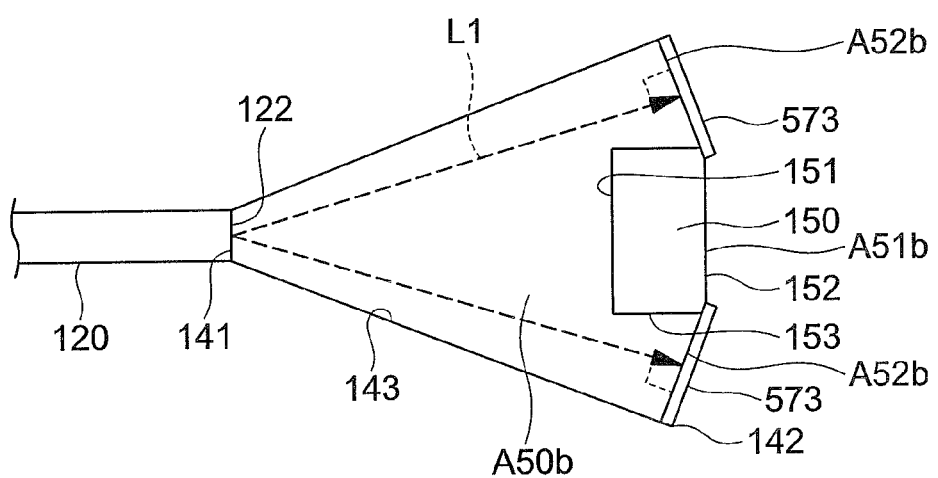
FIG. 11 is a cross-sectional view showing in an enlarged form a wavelength converting unit and a light guiding member of a lighting apparatus according to a second modified embodiment of the fifth embodiment of the present invention.

FIG. 11 is a cross-sectional view showing in an enlarged form a wavelength converting unit and a light guiding member of a lighting apparatus according to a second modified embodiment of the fifth embodiment. As shown in FIG. 11, in the second modified embodiment of the fifth embodiment, an excitation-light shielding film 573 is formed not on a flat surface but on an inclined surface. An angle of inclination of the inclined surface is set to be such that the inclined surface and the excitation light L1 which is irradiated on a circle having a diameter between an inner diameter and an outer diameter of the excitation-light shielding film 573 having a doughnut shape are substantially orthogonal.

Here, a wavelength-converted light propagating area A50b is formed, which is in continuity from the excitation-light emerging end 122 of the light guiding member 120 up to a second area A52b, and which is for making the wavelength-converted light L2 which has been reflected at least once at the reflecting portion 143, launch from the second area A52b, when an area of the holder launch opening 142 occupied by the second surface 152 is let to be a first area A51b, and an area of the holder launch opening 142 other than the first area A51b is let to be the second area A51b.

By making such an arrangement, even when the excitation light which is incident on the excitation-light shielding film made of a film of multiple layers of a dielectric substance having a doughnut shape is diffused light, it is possible to have a favorable reflectivity as compared to the first modified embodiment of the fifth embodiment.

The excitation-light shielding film may also be provided to the wavelength-converted light launch surface (the second surface 152) of the wavelength converting member similarly as in the first modified embodiment of the fifth embodiment.

By making such an arrangement, it is possible to realize a wavelength converting unit in which the excitation light is not launched to outside so easily, as compared to the first modified embodiment of the fifth embodiment.

Third Modified Embodiment of Fifth Embodiment

Figure 12A:
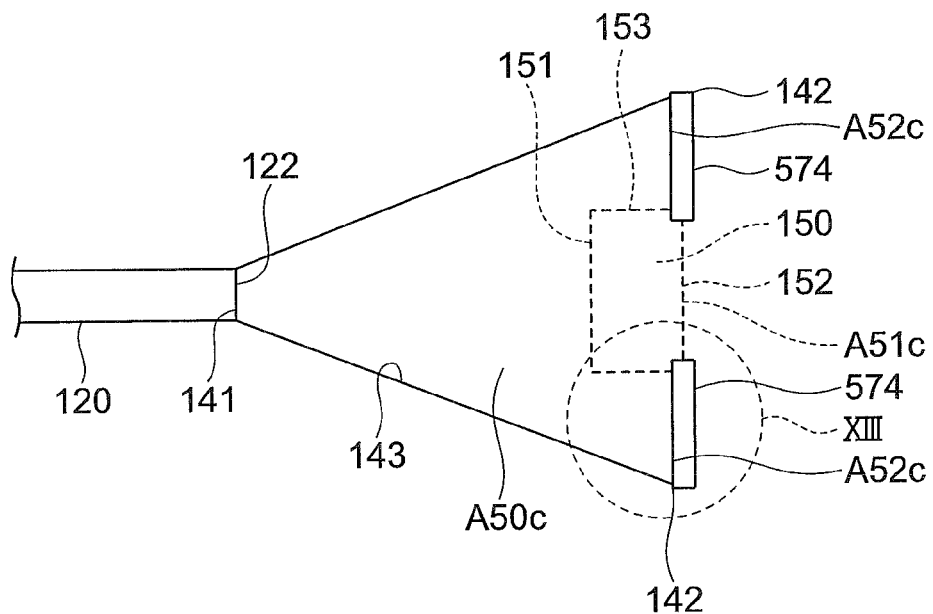
FIG. 12A is a cross-sectional view showing in an enlarged form a wavelength converting unit and a light guiding member of a lighting apparatus according to a third modified embodiment of the fifth embodiment.
Figure 12B:
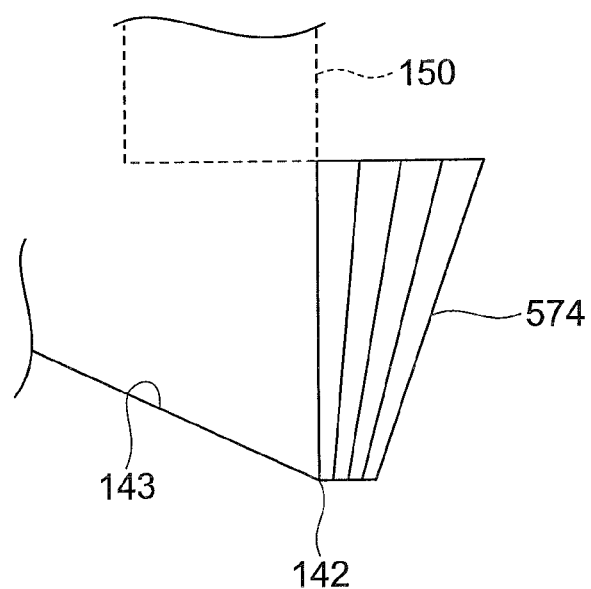
FIG. 12B is a diagram showing in an enlarged form a structure of an area around an excitation-light shielding film in FIG. 12A.

Next, a third modified embodiment of the fifth embodiment will be described below while referring to FIG. 12A and FIG. 12B. FIG. 12A is a cross-sectional view showing a wavelength converting unit and a light guiding member of a lighting apparatus according to the third modified embodiment of the fifth embodiment in an enlarged form and FIG. 12B is a diagram showing (XIII) in an enlarged form of an area around an excitation-light shielding film in FIG. 12A. In the third modified embodiment, a point that the interval of the film of multiple layers of a dielectric substance is different for an inner side and an outer side of the doughnut shape differs from the first modified embodiment.

In other words, since the excitation light L1 launched from the excitation-light emerging end 122 of the light guiding member 120 is diffused light, near the inner side of the film of multiple layers of a dielectric material having a doughnut shape, regarding an angle of incidence of the excitation light L1 for which a surface of incidence of the film of multiple layers of a dielectric material is let to be a base, the excitation light L1 is irradiated at a comparatively deeper angle, whereas near the outer side of the film of multiple layers of a dielectric material having a doughnut shape, the excitation light L1 is irradiated at a comparatively shallower angle. Generally, with respect to the film of multiple layers of a dielectric material having the same interval, for the light incident at a deep angle, the interval of the film of multiple layers of a dielectric material is found to be shorter and for the light incident at a shallow angle, the interval of the film of multiple layers of a dielectric material is found to be longer. Since the excitation L1 is laser light same as in the first embodiment, a line width of wavelength is as narrow as 1 nm and less. Consequently, by adjusting the interval of the film of multiple layers of a dielectric material according to the angle of incidence while matching with the wavelength, it is possible to realize the excitation-light shielding film 570 having high reflectivity on the entire surface of the film of multiple layers of a dielectric material irrespective of an irradiation angle of the excitation light. Concretely, it is preferable to make an arrangement such that the interval of the multilayer film near the inner side of the doughnut is longer than the interval of the multilayer film near the outer side as shown in FIG. 12B.

Here, a wavelength-converted light propagating area A50c is formed, which is in continuity from the excitation-light emerging end 122 of the light guiding member 120 up to a second area A52c, and which is for making the wavelength-converted light L2 which has been reflected at least once at the reflecting portion 143, launch from the second area A52c, when an area of the holder launch opening 142 occupied by the second surface 152 is let to be a first area A51c, and an area of the holder launch opening 142 other than the first area A51c is let to be the second area A52c.

By making such an arrangement, it is possible to realize a wavelength converting unit in which the excitation light is not irradiated to outside easily similarly as in the second modified embodiment of the fifth embodiment, and it is possible to realize a lighting apparatus in which, the optical filter can be made without making it to be inclined as in the second modified embodiment of the fifth embodiment.

Fourth Modified Embodiment of Fifth Embodiment

Figure 13:
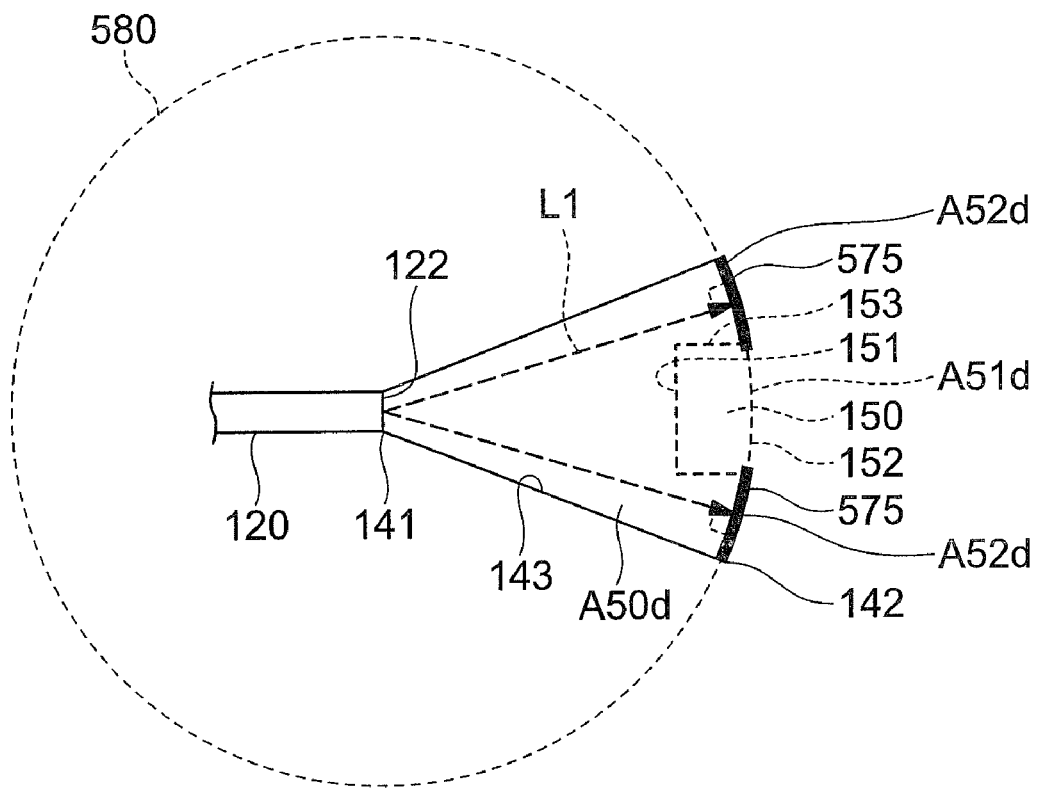
FIG. 13 is a cross-sectional view showing in an enlarged form a wavelength converting unit and a light guiding member of a lighting apparatus according to a fourth modified embodiment of the fifth embodiment of the present invention.

Next, a fourth modified embodiment of the fifth embodiment will be described below while referring to FIG. 13. FIG. 13 is a cross-sectional view showing in an enlarged form a wavelength converting unit and a light guiding member of a lighting apparatus according to the fourth modified embodiment of the fifth embodiment. In the fourth modified embodiment of the fifth embodiment, a point that an excitation-light shielding film 575 is disposed along a portion of a virtual spherical surface 580 having the excitation-light emerging end 122 of the light guiding member 120 as a center differs from embodiments from the first modified embodiment to the third modified embodiment of the fifth embodiment.

Here, a wavelength-converted light propagating area A50d is formed, which is in continuity from the excitation-light emerging end 122 of the light guiding member 120 up to a second area A52d, and which is for making the wavelength-converted light L2 which has been reflected at least once at the reflecting portion 143, launch from the second area A52d, when an area of the holder launch opening 142 occupied by the second surface 152 is let to be a first area A51d, and an area of the holder launch opening 142 other than the first area A51d is let to be the second area A52d.

By making such an arrangement, since the excitation light L1 launched from the light guiding member 120 is irradiated substantially perpendicularly to the excitation-light shielding film 575 irrespective of a direction of launch, it is possible to let the entire excitation light L1 irradiated directly to the excitation-light shielding film 575 have high reflectivity.

Consequently, it is possible to propose a structure in which the excitation light is not launched to outside easily, as compared to the first modified embodiment, the second modified embodiment, and the third modified embodiment of the fifth embodiment.

The fifth embodiment can be put together as follows.

The lighting apparatus of the fifth embodiment includes an excitation-light source, a light guiding member which guides the excitation light which has launched from the excitation-light source, and a wavelength converting unit which converts a wavelength of the excitation light guided by the light guiding member to a desired wavelength. In the lighting apparatus of the fifth embodiment, the wavelength converting unit includes a wavelength converting member, a wavelength-converted light propagating area which transmits the wavelength-converted light, and a holder. The holder has at least one through hole, and one opening (an opening on one side) of the through hole is a holder incidence opening which is optically connected to the excitation-light emerging end, and the other opening (and an opening on the other side) of the through hole is a holder launch opening through which the wavelength-converted light is irradiated. The excitation-light emerging end of the light guiding member is disposed near the holder incidence opening, and the wavelength-converted light propagating area is in continuity from the holder incidence opening up to the holder launch opening. An excitation-light shielding film which shields the excitation light is provided in an area of the wavelength-converted light propagating area, facing the holder launch opening.

In the lighting apparatus of the fifth embodiment, it is preferable that the excitation-light shielding film reflects the excitation light, and transmits the wavelength-converted light.

In the lighting apparatus of the fifth embodiment, it is preferable that the wavelength converting member is in the form of a circular plate which is disposed with a center thereof on the same axis as a central axis of the light guiding member, and an upper surface of the circular plate is facing the holder launch opening. Moreover, it is preferable that an area of the wavelength-converted light propagating area, facing the holder launch opening is an area having a doughnut shape surrounding the upper surface of the circular plate which is facing the holder launch opening of the wavelength converting member.

In the lighting apparatus of the fifth embodiment, it is preferable that the excitation-light shielding film is a film of multiple layers of a dielectric substance in which, films of dielectric substance having mutually different refractive index are stacked. Moreover, it is preferable that a film thickness of each dielectric substance is set to be such that a reflectivity of the excitation light which is irradiated directly to the excitation-light shielding film from the light guiding member emerging end is substantial.

In the lighting apparatus of the fifth embodiment, it is preferable that the excitation-light shielding film has the maximum reflectivity near a central line of (between) an inner diameter and an outer diameter of the doughnut shape.

In the lighting apparatus of the fifth embodiment, it is preferable that the excitation-light shielding film is substantially orthogonal with respect to a straight line connecting the emerging end of the light guiding member with an area near a central line of the inner diameter and the outer diameter of the doughnut shape.

In the lighting apparatus of the fifth embodiment, it is preferable that the excitation-light shielding film is disposed along a portion of a spherical surface having the emerging end of the light guiding member as a center.

In the lighting apparatus of the fifth embodiment, it is preferable that a thickness of the excitation-light shielding film differs according to the angle of incidence of the excitation light which is launched from the light guiding member.

Sixth Embodiment

Figure 14:
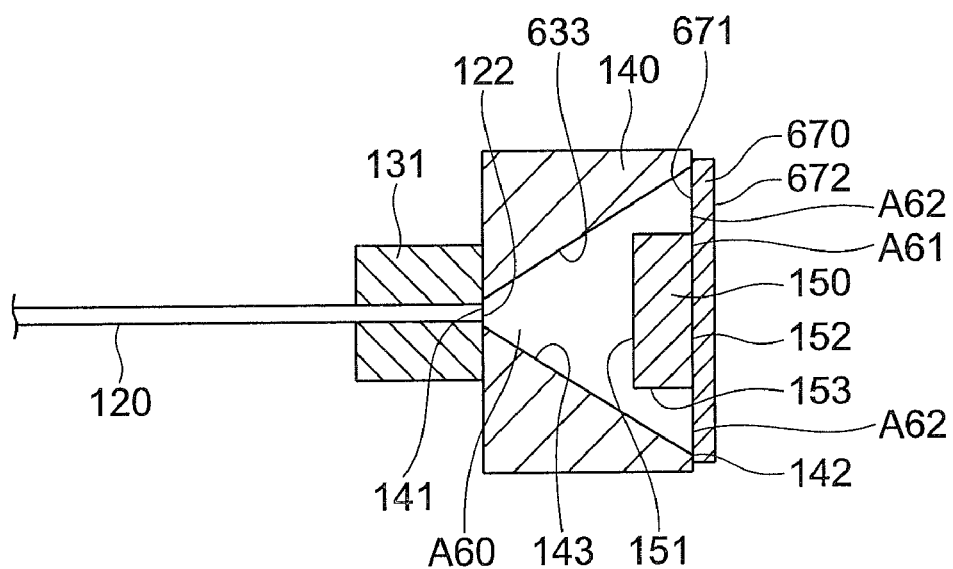
FIG. 14 is a cross-sectional view showing in an enlarged form a wavelength converting unit and a light guiding member of a lighting apparatus according to a sixth embodiment of the present invention.

Next, a lighting apparatus according to a sixth embodiment of the present invention will be described below by using FIG. 14. FIG. 14 is a cross-sectional view showing in an enlarged form a wavelength converting unit and a light guiding member of the lighting apparatus according to the sixth embodiment. Only points which differ from embodiments from the first embodiment to the fifth embodiment will be described below, and description of portions which are same will be omitted. In the lighting apparatus of the sixth embodiment, a point that at least a part of the wavelength-converted light propagating area is formed of a space 633 differs from embodiments from the first embodiment to the fourth embodiment. The rest of the structure is similar to the lighting apparatus of the first embodiment, and same reference numerals are used for members which are same as in the first embodiment.

[Structure]

In the lighting apparatus of the sixth embodiment, the through hole in the holder 140 is the space 633, and a transparent plate 670 (holding member) is installed on the holder launch opening 142. The wavelength converting member 150 is installed on a side of the transparent plate 670, toward the holder 140. The transparent plate 670 is disposed such that a first surface 671 thereof toward the light guiding member 120 makes a contact with the second surface 152 of the wavelength converting member 150. Moreover, the transparent plate 670 is installed to cover the entire surface of the holder launch opening 142.

Here, a wavelength-converted light propagating area A60 is formed, which is in continuity from the excitation-light emerging end 122 of the light guiding member 120 up to a second area A62, and which is for making the wavelength-converted light L2 which has been reflected at least once at the reflecting portion 143, launch from the second area A62, when an area of the holder launch opening 142 occupied by the second surface 152 is let to be a first area A61, and an area of the holder launch opening 142 other than the first area A61 is let to be the second area A62.

[Operation]

The excitation light L1 launched from the light guiding member 120 is launched to the space 633. At this time, the excitation light advances toward the wavelength converting member 150 while being spread according to a refractive index of the space 633 and the numerical aperture Fna of the optical fiber which is the light guiding member 120. The excitation light L1 is irradiated to the first surface 151 of the wavelength converting member 150, and a part thereof becomes the wavelength-converted light L2 which is irradiated to all directions irrespective of a direction of incidence of the excitation light L1. Out of the wavelength-converted light L2 which has launched, light irradiated to the reflecting portion 143 is reflected at the reflecting portion 143, and a part thereof is launched to outside upon passing through the space 633 and the transparent plate 670.

[Action and Effect]

In the lighting apparatus of the sixth embodiment, the light transmitting member of the embodiments from the first embodiment to the fifth embodiment includes the space 633 and the transparent plate 670. Since the space 633 absorbs almost no excitation light L1 and the wavelength-converted light L2, it is possible to use the excitation light L1 and the wavelength-converted light L2 more efficiently as compared to the embodiments from the first embodiment to the fifth embodiment. Moreover, since there is no absorption, the generation of heat by the light transmitting member can be made reduced.

The rest of the structure, action, and effect are similar as in the first embodiment.

First Modified Embodiment of Sixth Embodiment

Figure 15:
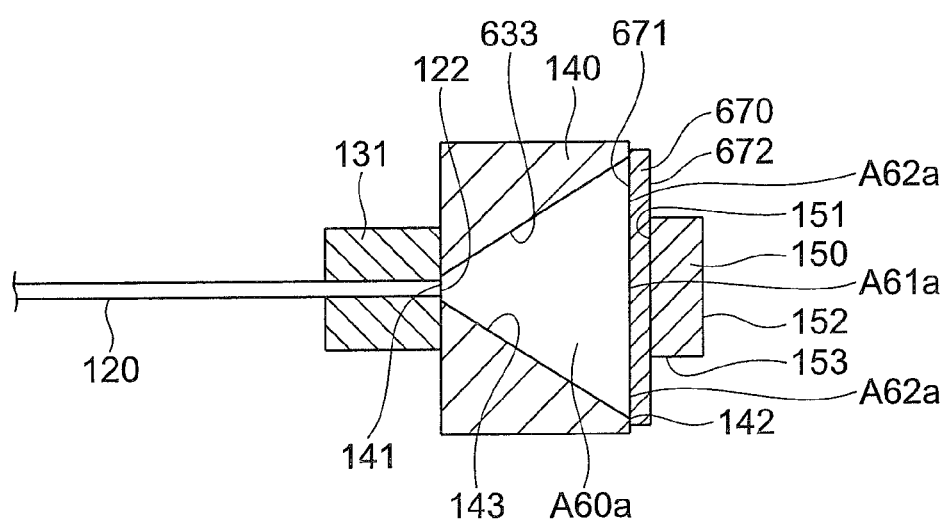
FIG. 15 is a cross-sectional view showing in an enlarged form a wavelength converting unit and a light guiding member of a lighting apparatus according to a first modified embodiment of the sixth embodiment of the present invention.

FIG. 15 is a cross-sectional view showing in an enlarged form a wavelength converting unit and a light guiding member of a lighting apparatus according to a first modified embodiment of the sixth embodiment. In the sixth embodiment, the wavelength converting member 150 is disposed on a side of the transparent plate 670 toward the holder 140. However, even when the wavelength converting member 150 is disposed sandwiching the transparent plate 670, on a side opposite to the holder 140, the same effect can be achieved. At this time, the wavelength converting member 150 is disposed such that the first surface 151 makes a contact with a second surface 672 of the transparent plate 670.

Moreover, the transparent plate 670 can also be provided with the excitation-light shielding film described in the fifth embodiment.

Here, a wavelength-converted light propagating area A60a is formed, which is in continuity from the excitation-light emerging end 122 of the light guiding member 120 up to a second area A62a, and which is for making the wavelength-converted light L2 which has been reflected at least once at the reflecting portion 143, launch from the second area A62a, when an area of the holder launch opening 142 opposite to the second area 152 is let to be a first area A61a, and an area of the holder launch opening 142 other than the first area A61a is let to be the second area A62a.

Second Modified Embodiment of Sixth Embodiment

Figure 16:
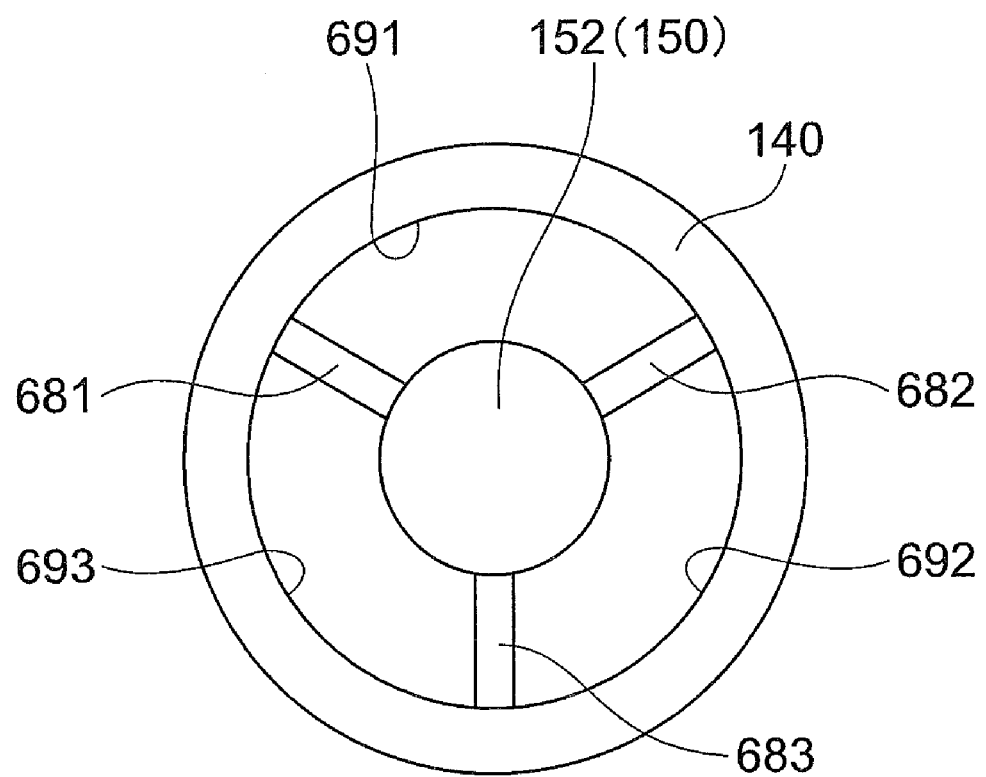
FIG. 16 is a front view showing a structure of a wavelength converting unit according to a second modified embodiment of the sixth embodiment.
Figure 17A:
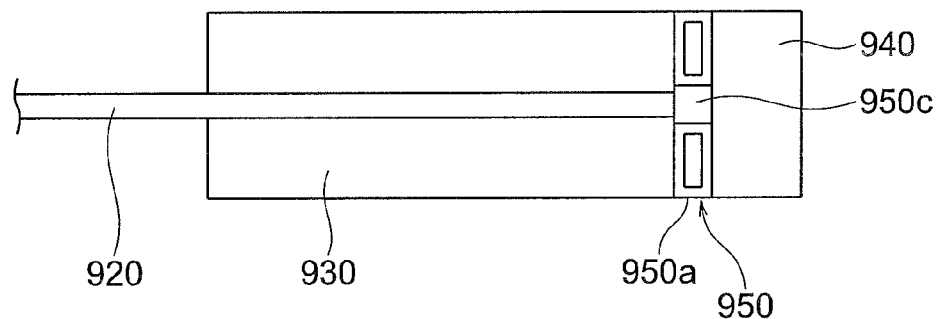
FIG. 17A is a diagram showing a schematic structure of an area around a wavelength converting member of a conventional lighting apparatus.
Figure 17B:
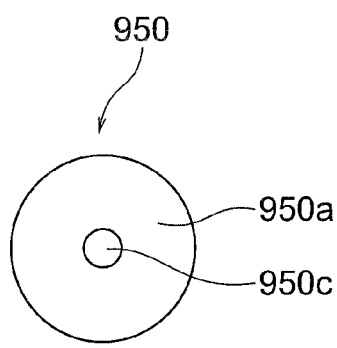
FIG. 17B is a front view showing a structure of a spacer used in the lighting apparatus in FIG. 17A.
Figure 17C:
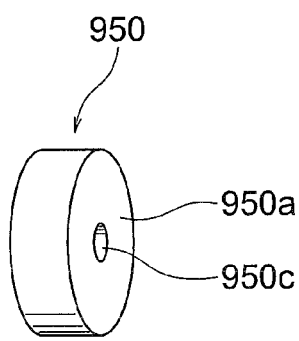
FIG. 17C is a diagrammatic perspective view showing a structure of a spacer used in the lighting apparatus in FIG. 17A.

FIG. 16 is a front view showing a structure of a wavelength converting unit according to a second modified embodiment of the sixth embodiment. In the second modified embodiment, as shown in FIG. 16, three fixing member 681, 682, and 683 (holding members) which fix the wavelength converting member 150 are used instead of the transparent plate 670 described above. The fixing members 681, 682, and 683, unlike the transparent plate 670, have openings 691, 692, and 693 respectively.

As shown in FIG. 16, the wavelength converting member 150 is fixed to the holder 140 by the three fixing members 681, 682, and 683, and area between each of the fixing members is the openings 691, 692, and 693 respectively.

By making an arrangement as in the second modified embodiment of the sixth embodiment, since a part of the wavelength-converted light L2 is launched to outside via only the space, there is no absorption anymore in this portion. Accordingly, it is possible to realize a lighting apparatus in which it is possible to extract the wavelength-converted light L2 efficiently.

Any sort of member can be used as the fixing members 681, 682, and 683 provided that the member is capable of holding the wavelength converting member 150. For instance, by using a transparent member for the wavelength-converted light L2, the efficiency of the wavelength-converted light L2 can be improved further. Moreover, by forming a reflecting portion (not shown in the diagram) which reflects the wavelength-converted light L2 on an outer surface of the fixing member 681, 682, and 683, an arrangement can be made such that the wavelength-converted light L2 which is irradiated to the fixing members 681, 682, and 683 is reflected, and a part of the reflected light is irradiated to further outside by the reflecting portion 143.

The embodiments and the modified embodiments described above are just a few examples, and it is possible to make various modifications which fairly fall within the basic teaching herein set forth.

At it has been described above, the lighting apparatus according to the present invention is useful as a lighting apparatus having a high efficiency of extracting the wavelength-converted light.

The lighting apparatus according to the present invention shows an effect that it is possible to improve an efficiency of extracting the wavelength-converted light which is subjected to wavelength conversion by the wavelength converting member.

What is claimed is:
1. A lighting apparatus comprising:
an excitation-light source;
a light guiding member which guides excitation light which has launched from the excitation-light source; and
a wavelength converting unit which converts a wavelength of the excitation light guided by the light guiding member to a desired wavelength, wherein
the wavelength converting unit includes at least a holder and a wavelength converting member, and
the holder has a through hole, and
an opening on one side of the through hole is a holder incidence opening which is connected to an excitation-light emerging end of the light guiding member, and
an opening on the other side of the through hole is a holder launch opening through which the wavelength-converted light is irradiated, and
at least a part of an inner surface of the through hole has a reflecting portion, and
the wavelength converting member has a first surface which is facing the excitation-light emerging end of the light guiding member, and a second surface which is an opposite side of the first surface, and
the first surface is isolated from the excitation-light emerging end of the light guiding member, and the second surface is disposed near the holder launch opening, and
an area of the second surface is smaller than an area of the holder launch opening, and
a wavelength-converted light propagating area is formed, which is in continuity from the excitation-light emerging end of the light guiding member up to a second area, and which is for making the wavelength-converted light which has been reflected at least once at the reflecting portion, launch from the second area, when an area of the holder launch opening which is occupied by the second surface is let to be a first area and an area of the holder launch opening other than the first area is let to be a second area.

2. The lighting apparatus according to claim 1, wherein the wavelength converting member and the inner surface of the through hole of the holder are disposed to be mutually isolated, and the wavelength-converted light propagating area is provided between the wavelength converting member and the inner surface of the through hole of the holder.

3. The lighting apparatus according to claim 2, wherein the wavelength-converted light propagating area is formed by filling a light transmitting member which transmits the wavelength-converted light and the excitation light.

4. The lighting apparatus according to claim 3, wherein the light transmitting member is one of a glass and a resin.

5. The lighting apparatus according to claim 3, wherein a gap layer having a refractive index smaller than a refractive index of the light transmitting member is provided on at least a part of an area between the light transmitting member and the inner surface of the through hole of the holder.

6. The lighting apparatus according to claim 5, wherein the gap layer is a space, and the light transmitting member and the inner surface of the through hole of the holder are partly isolated.

7. The lighting apparatus according to claim 1, wherein the inner surface of the through hole of the holder is a tapered surface having a shape of a truncated cone which is widened from the holder incidence opening toward the holder launch opening.

8. The lighting apparatus according to claim 3, wherein the wavelength converting member is disposed such that the first surface is in contact with the light transmitting member.

9. The lighting apparatus according to claim 8, wherein a side surface of the wavelength converting member is surrounded by the light transmitting member.

10. The lighting apparatus according to claim 9, wherein the second surface of the wavelength converting member is surrounded by the light transmitting member.

11. The lighting apparatus according to claim 1, wherein a light shielding filter which shields the excitation light is provided on at least a part of an area of the wavelength-converted light propagating area, which is facing the holder launch opening.

12. The lighting apparatus according to claim 11, wherein the light shielding filter is a wavelength selecting reflective film which reflects the excitation light and transmits the wavelength-converted light.

13. The lighting apparatus according to claim 1, wherein
the wavelength converting member is a circular cylindrical, of which the first surface is substantially circular, and
a size of the first surface of the wavelength converting member is larger than a beam spot which the excitation light launched from the optical fiber forms on a flat surface including the first surface of the wavelength converting member.

14. The lighting apparatus according to claim 13, wherein the light guiding member is an optical fiber having a numerical aperture Fna, and the wavelength-converted light propagating area is filled with a resin having a refractive index nr, and when a central axial distance on the optical fiber between an emerging end of the optical fiber and the first surface of the wavelength converting member is D, a radius Rp of the circular-shaped first surface of the wavelength converting member satisfies the following expression (1)

$$Rp \geq D \cdot \tan(\arcsin(Fna/nr)) \qquad (1).$$

15. The lighting apparatus according to claim 14, wherein the inner surface of the through hole of the holder is a tapered surface having a shape of a truncated cone which is widened from the holder incidence opening toward the holder launch opening, and a taper angle φ between the central axial direction of the optical fiber and the tapered surface satisfies the following expression (2)

$$\phi > \arctan(Rp/D) \qquad (2).$$

16. The lighting apparatus according to claim 2, wherein the wavelength converting member is fixed to the holder by a holding member, and a part of the wavelength-converted light propagating area is a space.

17. The lighting apparatus according to claim 16, wherein the holding member is a transparent plate through which transmits the wavelength-converted light.

18. The lighting apparatus according to claim 16, wherein the holding member has an opening in a part thereof, and the wavelength-converted light propagating area is a space which is in continuity from the holder incidence end up to the holder emerging end.

19. A lighting apparatus comprising:

a light source from which light-source light is launched;

a first optical member which converts the light-source light to a wavelength-converted light having a desired wavelength and from which the wavelength-converted light is launched toward the light source; and a second optical member from which the wavelength-converted light is launched toward the first optical member, wherein the first optical member includes a first portion which configures a first area on which the wavelength-converted light launched from the second optical member is incident, and a second portion which configures a border of a second area on which the wavelength-converted light launched from the second optical member is not incident.

* * * * *